(12) United States Patent
Jansson et al.

(10) Patent No.: US 11,474,766 B2
(45) Date of Patent: Oct. 18, 2022

(54) ADAPTIVE INTERPAGE DELAYS

(71) Applicant: Hewlett-Packard Development Company, L.P., Spring, TX (US)

(72) Inventors: Cristopher Royce Jansson, Vancouver, WA (US); Elliott Michael Downing, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/435,757

(22) PCT Filed: Jul. 18, 2019

(86) PCT No.: PCT/US2019/042308
§ 371 (c)(1),
(2) Date: Sep. 2, 2021

(87) PCT Pub. No.: WO2021/011001
PCT Pub. Date: Jan. 21, 2021

(65) Prior Publication Data
US 2022/0129224 A1   Apr. 28, 2022

(51) Int. Cl.
*G06F 3/12* (2006.01)
*B41J 29/38* (2006.01)
*G06K 15/00* (2006.01)

(52) U.S. Cl.
CPC ............ *G06F 3/1264* (2013.01); *B41J 29/38* (2013.01); *G06F 3/1208* (2013.01); *G06F 3/1286* (2013.01); *G06K 15/403* (2013.01)

(58) Field of Classification Search
CPC .... G06F 3/1264; G06F 3/1208; G06F 3/1286; G06K 15/403
USPC .......................................................... 358/1.15
See application file for complete search history.

(56) References Cited

U.S. PATENT DOCUMENTS

| | | | |
|---|---|---|---|
| 5,606,695 A | 2/1997 | Dworzecki | |
| 6,099,181 A | 8/2000 | Kitabatake | |
| 6,276,267 B1 | 8/2001 | Yoneoka | |
| 7,254,355 B2 | 8/2007 | Sahay et al. | |
| 8,231,287 B2 | 7/2012 | Burger et al. | |
| 8,564,822 B2 | 10/2013 | Kawasaki et al. | |
| 10,963,201 B1 * | 3/2021 | Conley | G06F 3/1212 |
| 2009/0065998 A1 | 3/2009 | Iguchi | |
| 2017/0101284 A1 | 4/2017 | Menezes | |

* cited by examiner

*Primary Examiner* — Kent Yip
(74) *Attorney, Agent, or Firm* — HP Inc. Patent Department

(57) ABSTRACT

An example method includes maintaining, by a processing resource associated with a finisher communicatively coupled to a printer, an interpage delay table, the interpage delay table storing an interpage delay value for each of a plurality of page attribute combinations. The method further includes processing, by the finisher, a job based at least in part on a particular interpage delay value stored in the interpage delay table for an identified page attribute combination.

15 Claims, 4 Drawing Sheets

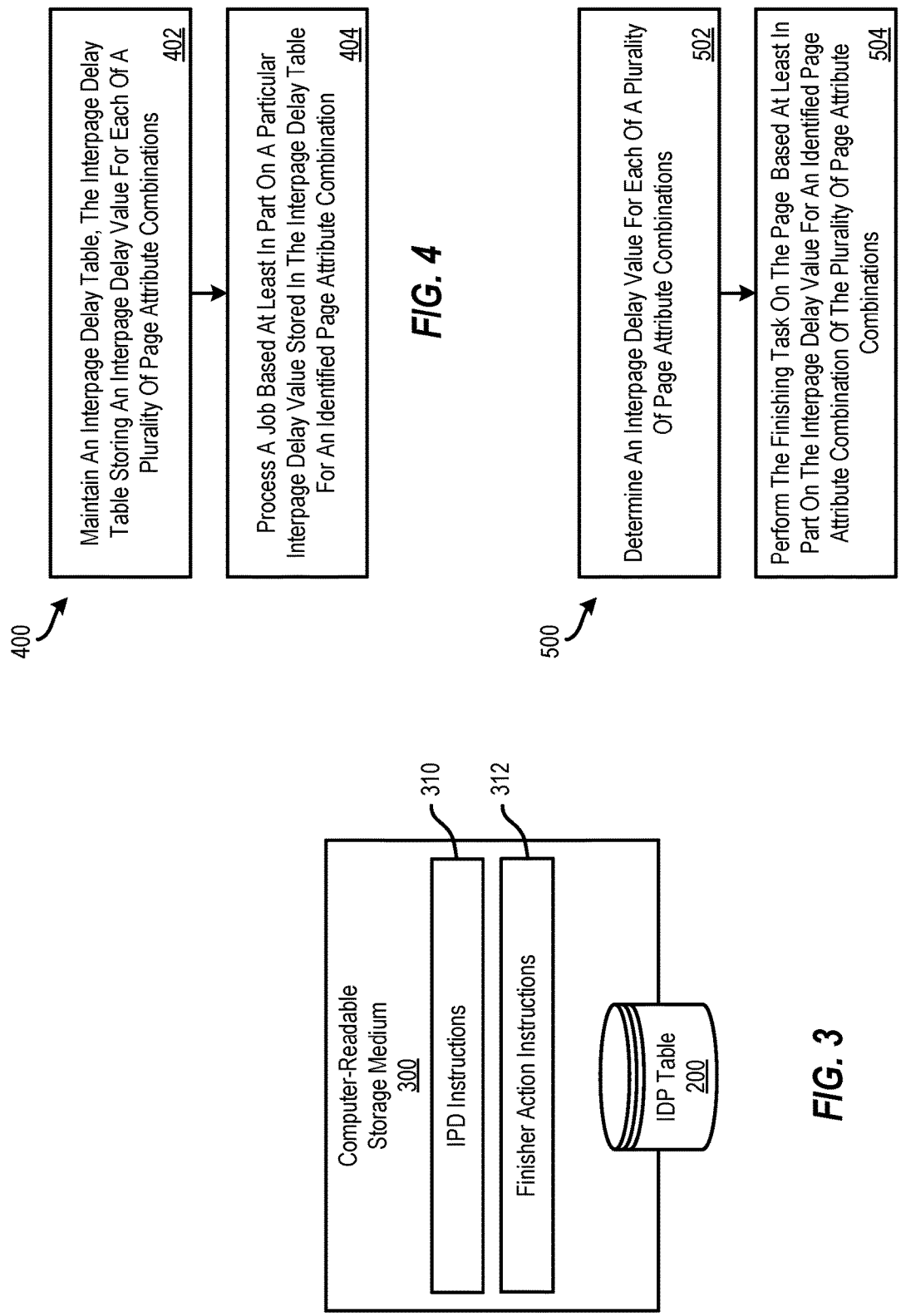

ADAPTIVE INTERPAGE DELAYS

BACKGROUND

A printer is a device that applies a substance (e.g., ink, toner, dye, etc.) to a medium (e.g., paper). Printers can vary in type, and examples include laser printers, inkjet printers, solid ink printers, thermal printers, dye-sublimation printers, and others. A printer can be equipped with or connected (mechanically and/or communicatively) to a finisher, which receives the medium from the printer subsequent to the printing and performs finishing tasks.

BRIEF DESCRIPTION OF THE DRAWINGS

The following detailed description references the drawings, in which:

FIG. 3 depicts a computer-readable storage medium comprising instructions for adaptive interpage delay according to examples described herein;

FIG. 4 depicts a flow diagram of a method for adaptive interpage delays according to examples described herein;

FIG. 5 depicts a flow diagram of a method for adaptive interpage delays according to examples described herein.

DETAILED DESCRIPTION

Figure 1:
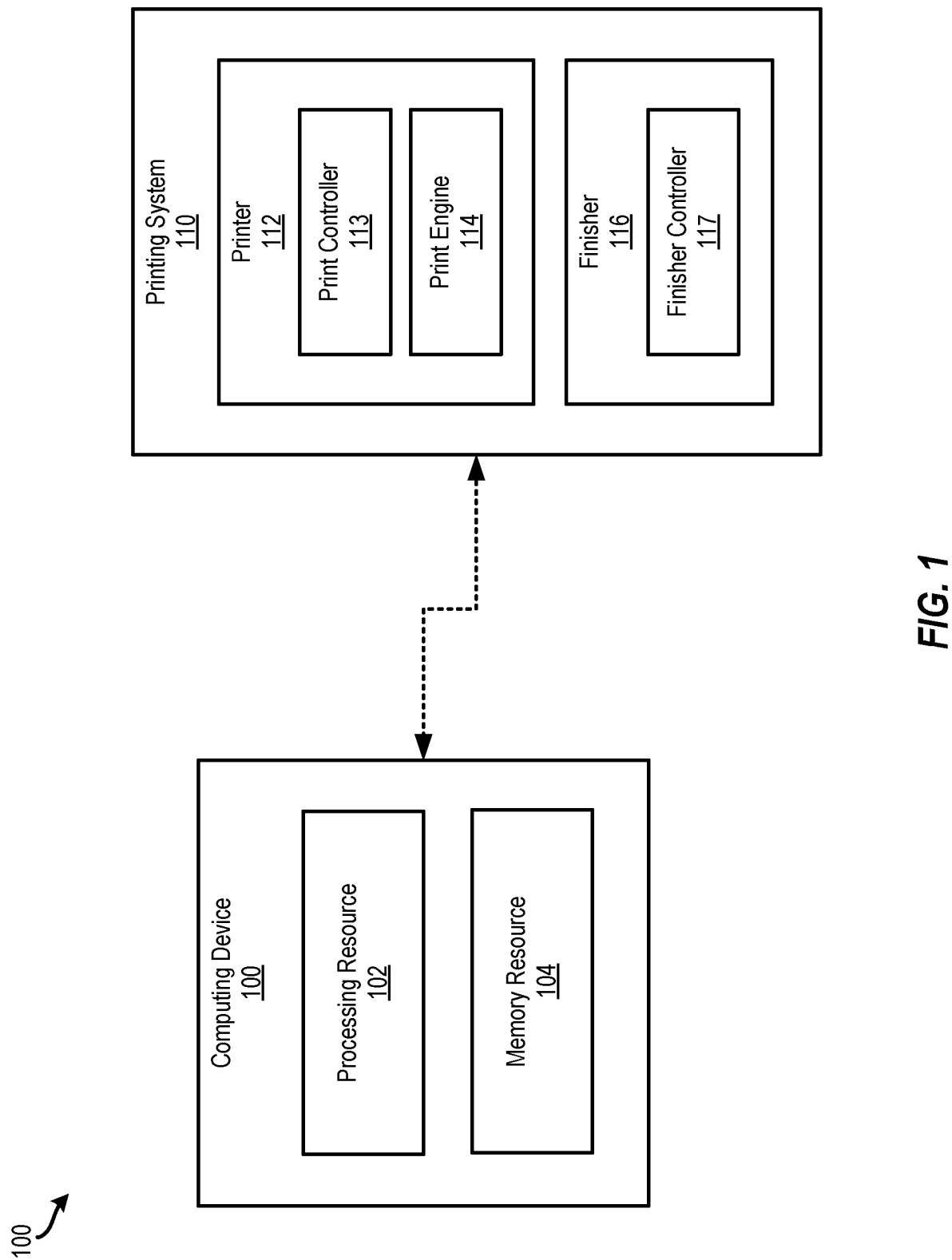
FIG. 1 depicts a computing device being communicatively coupled to a printing system, which utilizes adaptive interpage delays, according to examples described herein.

The techniques described herein provide for adaptive interpage delays, which is an approach to synchronizing page timing between a print engine of a printer and a finisher. A finisher is a device attached to a printer that performs post-printing actions (e.g., stapling, hole punching, collating, folding, etc.).

In a printer system that includes a finisher and a print engine that are separately controlled mechanisms, there is communication between them to synchronize the passing of pages from the print engine to the finisher. The finisher provides, to the print engine, the expected arrival time of pages to ensure it is ready to receive the pages. Page timing is expressed as the time between two pages measured from the trailing edge of one page to a leading edge of the next page and is referred to as the "interpage delay" (IPD). In some cases, a static IPD value is implemented. This static IPD value may work across a large population of printers and finishers, but this "one size fits all" approach is not optimal because the printers must operate at the same rate to accommodate the slowest performing units in the population.

The present techniques address this shortcoming by applying an adaptive IPD approach. According to the techniques described herein, the finisher provides, to the print engine, an IPD value for each page of a job based on the attributes of the page and possibly attributes of the previous and next pages. Before a page is delivered to the finisher, the finisher receives an announcement from the print engine that provides the attributes of the page. The finisher then calculates the required IPD for that page attribute combination and transmits that value to the print engine. Examples of attributes include page size, page shape, page orientation, page weight, speed, whether duplexed, finishing task, etc. Page attribute combinations are combinations of the various page attributes. For example, a page attribute combination can be as follows: page size A4, short edge feed. Another example page attribute combination is page size letter, long edge feed. These and other examples of page attribute combinations are possible.

The finisher maintains a table, referred to as an IPD table, that contains page attribute combinations as well as the IPD associated with each of those page attribute combinations. Each page attribute combination utilizes a separate IPD value since the processing times are different depending on the page attributes. For example, an IPD value associated with an 8.5"×11.0" ("letter") page size may be different than an IPD value associated with an A4 page size. Similarly, IPD value associated with an A4 page size in a landscape orientation may be different than an IPD value associated with an A4 page size in a portrait orientation.

As the finisher receives each page, the finisher measures how much time it takes to process the page. It then uses the measurement to update its page processing time estimate which, in turn, is used to determine its IPD value. Page processing times are modeled with a normal distribution or other suitable statistical technique. The finisher records the measurements and can calculate a mean, a standard deviation, average, minimum, maximum, etc. for each page attribute combination. While printing, each page produces an update to the corresponding entry in the IPD table. The next page with the same page attribute combination uses the updated IPD values stored in the IPD table. This approach optimizes the throughput of each printer to enable fast and efficient printing while preventing jams. That is, the IPD for a page attribute combination can be determined that optimizes performance while minimizing jams caused by random variations in page processing times. In the IPD value is too long, time is wasted; if the IPD value is too short, a jam may occur when the page arrives at the finisher before the finisher is ready to receive the page.

Additional benefits of the adaptive interpage delay techniques described herein include the IPD value matching the capabilities of individual printers, the IPD value being adjustable to match the performance of the printer over time, the IPD value being adjustable to environmental changes, and the theoretical jam rate (as caused by randomness in processing time) being reduced. These and other advantages are described herein and/or are apparent therefrom.

Figure 2:
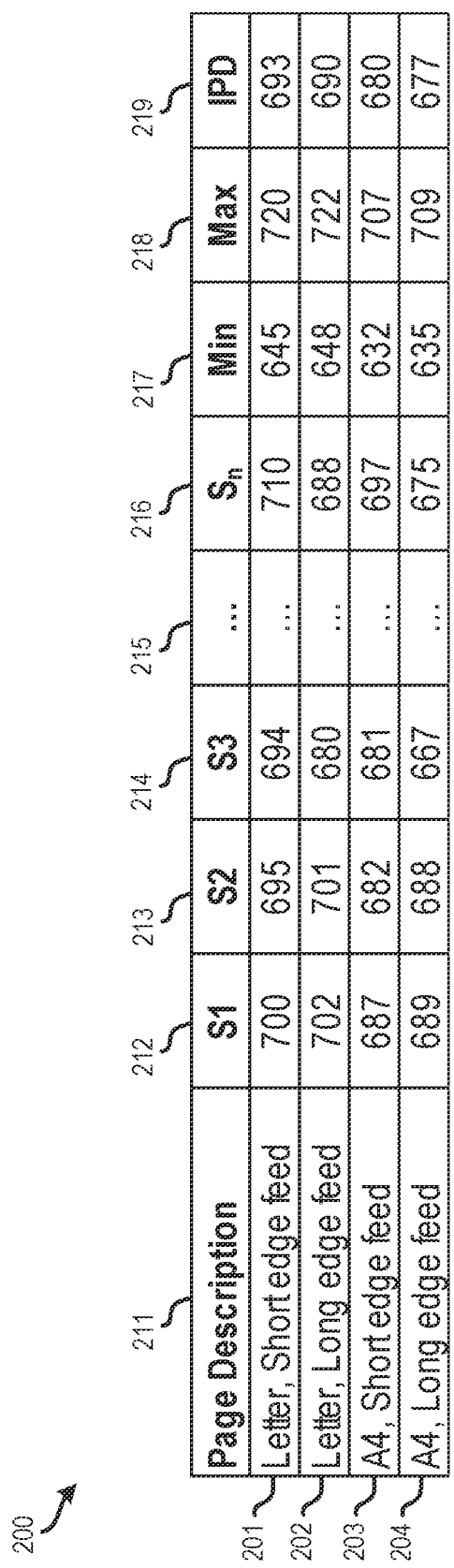
FIG. 2 depicts an IPD table storing interpage delay values and other data associated with page attribute combinations according to examples described herein.

FIGS. 1-3 include components, modules, engines, etc. according to various examples as described herein. In different examples, more, fewer, and/or other components, modules, engines, arrangements of components/modules/engines, etc. can be used according to the teachings described herein. In addition, the components, modules, engines, etc. described herein are implemented as software modules executing machine-readable instructions, hardware modules, or special-purpose hardware (e.g., application specific hardware, application specific integrated circuits (ASICs), field programmable gate arrays (FPGAs), embedded controllers, hardwired circuitry, etc.), or some combination of these.

FIG. 1 relates to components, engines, and modules of a computing device, such as a computing device 100 of FIG. In examples, the computing device 100 is any appropriate type of computing device, such as smartphones, tablets, desktops, laptops, workstations, servers, smart monitors, smart televisions, digital signage, scientific instruments, retail point of sale devices, video walls, imaging devices, peripherals, networking equipment, wearable computing devices, or the like.

FIG. 1 depicts a computing device 100 being communicatively coupled to a printing system 110, which utilizes adaptive interpage delays, according to examples described herein.

The computing device 100 includes a processing resource 102 that represents any suitable type or form of processing unit or units capable of processing data or interpreting and executing instructions. For example, the processing resource 102 includes central processing units (CPUs), microprocessors, and/or other hardware devices suitable for retrieval and execution of instructions. The instructions are stored, for example, on a non-transitory tangible computer-readable storage medium, such as memory resource 104 (as well as computer-readable storage medium 300 of FIG. 3), which may include any electronic, magnetic, optical, or another physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions are stored during runtime, and a secondary memory, such as a nonvolatile memory in which a copy of the instructions is stored.

The printing system 110 includes a printer 112 having a print engine 114. The print engine 114 generates a printed medium (i.e., a printed image) using instructions received from a print controller 113 of the printer 112.

The printing system 110 also includes a finisher, which can be connected (mechanically and/or communicatively) to the printer 112. Subsequent to the print engine 114 of the printer 112 generating the printed medium, the print engine 114 outputs the printed medium, which is received by the finisher 116. The finisher 116 receives the printed medium and performs a finishing task on the printed medium. Examples of finishing tasks include a hole punch task, a staple task, a collating task, a folding task, etc. The finisher controller 117 can be any suitable device (or combination of devices) to process instructions, store data, and the like. For example, the finisher controller 117 can be a microprocessor having a processor and a memory.

According to an example, the finisher 116 receives a page (i.e., the printed medium) from the printer 112 (particularly from the print engine 114). The Finisher controller 117 determines an IPD value for each of a plurality of page attribute combinations. To do this, the finisher controller 117 stores processing time statistics (also referred to as "processing times") for processing pages of various page attribute combinations. For example, the finisher controller 117 measures processing times for performing finishing tasks on various page attribute combinations. These processing times can be stored in an IPD table.

An example of such an IPD table is shown in FIG. 2, which depicts an IPD table 200 storing IPD values 219 and other data associated with the page attribute combinations according to examples described herein. In particular, the IPD table 200 includes rows 201, 202, 203, 204. Each of the rows 201-204 is associated with a page attribute combination (e.g., the row 201 is associated with the page attribute combination "letter, short edge feed;" the row 202 is associated with the page attribute combination "letter, long edge feed;" the row 203 is associated with the page attribute combination "A4, short edge feed;" and the row 204 is associated with the page attribute combination "A4, long edge feed). Other page attribute combinations are also possible and can be stored in additional rows (not shown) of the IPD table 200.

The IPD table 200 also includes columns that include a page description (column 211), processing time statistics $S_n$ (where n is an integer representing the most recently processed page, n−1 is an integer representing the second most recently processed page, etc.) (columns 212, 213, 214, 215, 216), minimum processing times (column 217), maximum processing times (column 218), and IPD value 219. The IPD values 219 is determined based on the processing times. For example, the IPD value 219 can be based on the minimum processing time, the maximum processing time, an average processing time (which can be a mean processing time and/or a median processing time), etc. The IPD table 200 can include additional columns (not shown) for these additional values (e.g., the average processing time). As one example, the IPD value is the average (mean or median) of the processing times for the last ten jobs. As another example, the IPD value is the maximum processing time over the life of the finisher 116 and/or printing system 110. These and other examples are possible for determining the IPD value 219.

With continued reference to FIG. 1, the finisher controller 117 uses the IPD value associated with an identified page attribute combination to perform a finishing task on the page. In other words, the finisher 116 performs the finishing task while delaying a next page the IPD value amount of time. This ensures the next page is delivered timely (e.g., not too early to cause a jam and not too late to reduce efficiency).

Alternatively or additionally in other examples, the computing device 100 and/or the printing system 110 include dedicated hardware, such as integrated circuits, ASICs, Application Specific Special Processors (ASSPs), FPGAs, or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

FIG. 3 depicts a computer-readable storage medium 300 comprising instructions for adaptive interpage delay according to examples described herein. The computer-readable storage medium 300 is non-transitory in the sense that it does not encompass a transitory signal but instead is made up of storage components that store the instructions. The computer-readable storage medium may be representative of the memory resource 104 of FIG. 1 or another suitable memory and may store machine-executable instructions in the form of modules or engines. These instructions can be executed, for example, by the finisher controller 117 of the finisher 116 of FIG. 1 or by another suitable processing device or system.

In the example shown in FIG. 3, the instructions include IPD instructions 310 and finisher action instructions 312. In some examples, the computer-readable storage medium 300 stores the IPD table 200 or is coupled to a storage device for storing the IPD table 200. The instructions of the computer-readable storage medium 300 are executable to perform the techniques described herein, including the functionality described regarding the method 400 of FIG. 4, the method 500 of FIG. 5, and/or the method 600 of FIG. 6. The functionality of these modules is described below with reference to the functional blocks of FIGS. 4, 5, and 6 but should not be construed as so limiting.

In particular, FIG. 4 depicts a flow diagram of a method 400 for adaptive interpage delays according to examples described herein. The method 400 is executable by a computing device such as the finisher controller 117. The method 400 is described with reference to the instructions stored on the computer-readable storage medium 300 of FIG. 3 and the components of FIG. 1 as an example but is not so limited.

At block 402 of FIG. 4, the finisher controller 117 (i.e., a processing resource) associated with the finisher 116 coupled to the printer 112 uses the IPD instructions 310 to maintain an IPD table (e.g., the IPD table 200). The interpage delay table 200 stores an IPD value for each of a plurality of page attribute combinations. The IPD value can be calculated in various ways. For example, the IPD value can be calculated based on previous processing times for jobs with the same page attribute combinations. That is, processing times are measured for a particular set of page attribute combinations. These processing times are used to calculate an IPD value for that particular set of page attribute combinations. The IPD value can be calculated based on an average (mean or median) of the processing times for that particular set of page attribute combinations, based on a minimum or maximum value for that particular set of page attribute combinations, and the like. Other statistical techniques can also be applied to determine/calculate the IPD value for a particular set of page attribute combinations.

At block 404, the finisher 116 uses the finisher action instructions 312 to processes a job based at least in part on a particular IPD value stored in the IPD table for an identified page attribute combination. For example, the finisher controller 117 of the finisher 116 provides the IPD value to the print controller 113, which causes the print engine 114 to send a job/page to the finisher 116 at a time determined by the IPD value sent by the finisher controller 117. The finisher 116 is ready to receive the page at that time and then processes the job (i.e., performs the finisher action).

Additional processes also may be included. For example, the method 400 can include determining, using the IPD instructions 310, a measured processing time for processing the job. The IPD instructions 310 can update the IPD table to include the measured processing time for processing the job (i.e., the processing time can be added to a column of the table 200). Further, the IPD instructions 310 can update the interpage delay value for the particular IPD value based at least in part on the measured processing time for processing job (i.e., the IPD value is recalculated based on the processing time for processing the job). It should be understood that the processes depicted in FIG. 4 represent illustrations and that other processes may be added or existing processes may be removed, modified, or rearranged without departing from the scope of the present disclosure.

In particular, FIG. 5 depicts a flow diagram of a method 500 for adaptive interpage delays according to examples described herein. The method 500 is executable by a computing device such as the finisher controller 117. The method 500 is described with reference to the instructions stored on the computer-readable storage medium 300 of FIG. 3 and the components of FIG. 1 as an example but is not so limited.

At block 502 of FIG. 5, the finisher controller 117 uses the IPD instructions 310 to determine an interpage delay value for each of a plurality of page attribute combinations. The IPD value can be determined in any of a number of different ways, including by averaging processing times for previous jobs for the different page attribute combinations. In some cases, the IPD is calculated based on a total of the processing jobs for a particular page attribute combination over the life of the printing system 110. However, in other cases, the IPD is calculated based on a number n of the last number of jobs processed for that particular page attribute combinations. For example, the last 10 (n=10) processing times for jobs of a particular page attribute combination are considered when determining the IPD value. This enables recent history to be considered, which accounts for the aging of the printing system 110.

At block 504, the finisher controller 117 uses the finisher action instructions 312 to cause the finisher 116 to perform the finishing task on the page based at least in part on the interpage delay value for an identified page attribute combination of the plurality of page attribute combinations. For example, the finisher controller 117 of the finisher 116 provides the IPD value to the print controller 113, which causes the print engine 114 to send a job/page to the finisher 116 at a time determined by the IPD value sent by the finisher controller 117. The finisher 116 is ready to receive the page at that time and processes the job (i.e., performs the finisher action).

Additional processes also may be included, and it should be understood that the processes depicted in FIG. 5 represent illustrations and that other processes may be added or existing processes may be removed, modified, or rearranged without departing from the scope of the present disclosure.

Figure 6:
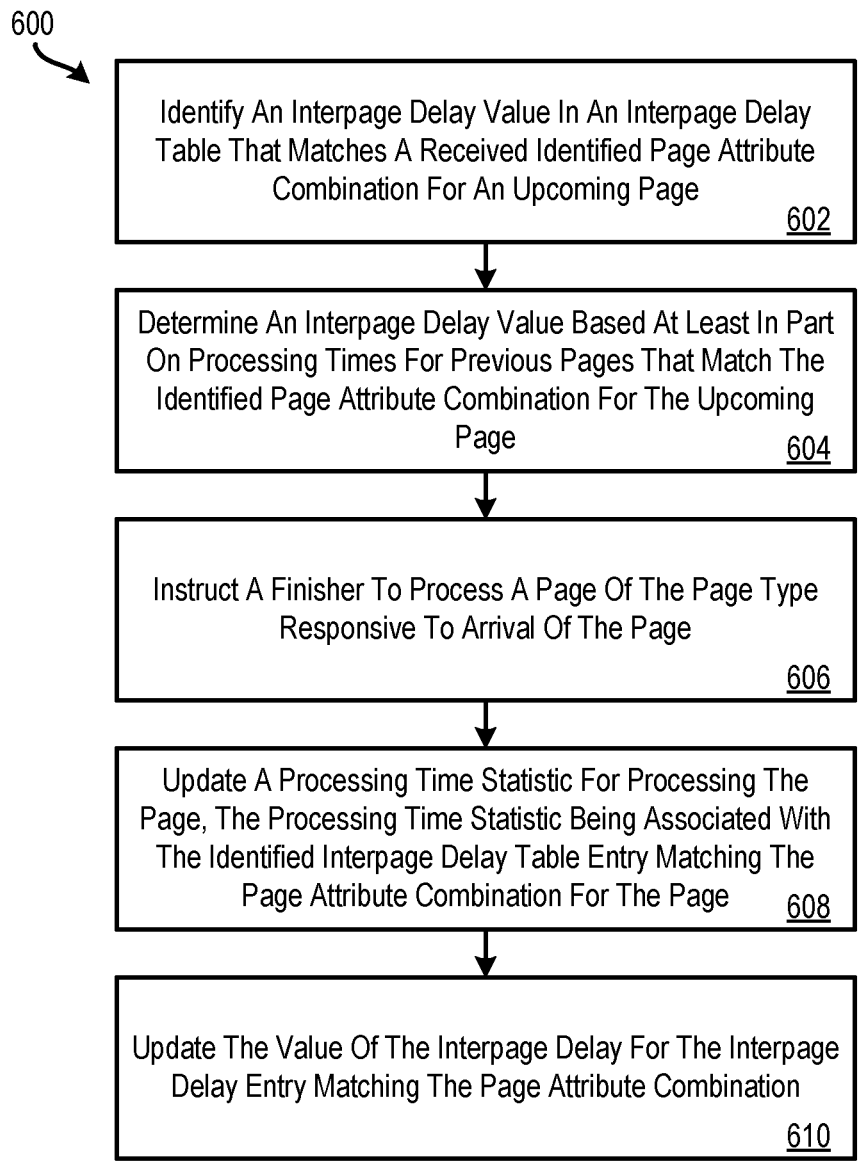
FIG. 6 depicts a flow diagram of a method for adaptive interpage delays according to examples described herein.

In particular, FIG. 6 depicts a flow diagram of a method 600 for adaptive interpage delays according to examples described herein. The method 600 is executable by a computing device such as the finisher controller 117. The method 600 is described with reference to the instructions stored on the computer-readable storage medium 300 of FIG. 3 and the components of FIG. 1 as an example but is not so limited.

At block 602 of FIG. 6, the finisher controller 117, using the IPD instructions 310, receives an identified page attribute combination for a page and uses the page attribute combination to identify a matching entry in an IPD table.

At block 604, the finisher controller 117, using the IPD instructions 310, determines an IPD value based at least in part on processing times for previous pages that match the identified page attribute combination for the page.

At block 606, the finisher controller 117, using the finisher action instructions 312, instructs the finisher 116 to process the page when received responsive to the arrival of the page. The finisher receives the page from the print engine 114 at a time that is based on the identified IPD value.

At block 608, the finisher controller 117, using the IPD instructions 310, updates a processing time for processing the page (i.e., the amount of time that the finisher 116 took to process the upcoming page) and stores the updated processing time in the IPD table.

At block 610, the finisher controller 117, using the IPD instructions 310, updates (i.e., re-calculates) the IPD value using the processing time for processing the page in an IPD entry of the IPD table matching the page attribute combination for the page.

Additional processes also may be included, and it should be understood that the processes depicted in FIG. 6 represent illustrations and that other processes may be added or existing processes may be removed, modified, or rearranged without departing from the scope of the present disclosure.

It should be emphasized that the above-described examples are merely possible examples of implementations and set forth for a clear understanding of the present disclosure. Many variations and modifications may be made to the above-described examples without departing substantially from the principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A printing system comprising:
a printer comprising a print engine; and
a finisher to receive a page from the print engine and to perform a finishing task on the page, the finisher comprising a finisher controller to:
determine an interpage delay value for each of a plurality of page attribute combinations; and
perform, by the finisher, the finishing task on the page based at least in part on the interpage delay value for an identified page attribute combination of the plurality of page attribute combinations.

2. The printing system of claim 1, the finisher controller further to transmit the interpage delay value for the identified page attribute combination to the printer prior to performing the finishing task, wherein the finisher receives the page subsequent to completing a preceding finisher task based at least in part on the interpage delay value.

3. The printing system of claim 1, the finisher controller further to store the determined interpage delay value for each of the plurality of page attribute combinations in an interpage delay table.

4. The printing system of claim 3, the finisher controller further to update the interpage delay value for the identified page attribute combination based on a processing time associated with performing the finishing task on the page.

5. The printing system of claim 1, wherein the finishing task is selected from a group consisting of a hole punch task, a staple task, a collating task, and a folding task.

6. A method comprising:
maintaining, by a processing resource associated with a finisher communicatively coupled to a printer, an interpage delay table, the interpage delay table storing an interpage delay value for each of a plurality of page attribute combinations; and
processing, by the finisher, a job based at least in part on a particular interpage delay value stored in the interpage delay table for an identified page attribute combination.

7. The method of claim 6, further comprising:
determining, by the processing resource, a measured processing time for processing the job.

8. The method of claim 7, further comprising:
updating, by the processing resource, the interpage delay table to include the measured processing time for processing the job; and
updating, by the processing resource, the interpage delay value for the particular interpage delay value based at least in part on the measured processing time for processing the job.

9. A non-transitory computer-readable storage medium comprising instructions that, when executed by a processing resource of a computing device, cause the processing resource to:
identify an interpage delay value in an interpage delay table that matches a received identified page attribute combination for a page;
transmit the identified interpage delay value to a print engine, the identified interpage delay value being applied to a page of the page attribute combination; and
instruct a finisher to perform a finishing task on the page of the page type responsive to arrival of the page.

10. The non-transitory computer-readable storage medium of claim 9, wherein the instructions further cause the processing resource to update a processing time statistic for processing the page, the processing time statistic being associated with the identified interpage delay table entry matching the page attribute combination for the page.

11. The non-transitory computer-readable storage medium of claim 9, wherein the instructions further cause the processing resource to update the interpage delay value for the interpage delay entry matching the page attribute combination of the page.

12. The non-transitory computer-readable storage medium of claim 9, wherein the interpage delay value is calculated based on an average processing time for processing pages of the page attribute combination.

13. The non-transitory computer-readable storage medium of claim 9, wherein the interpage delay value is calculated based on a maximum processing time for processing pages of the page attribute combination.

14. The non-transitory computer-readable storage medium of claim 9, wherein the interpage delay value is calculated based on a minimum processing time for processing pages of the page attribute combination.

15. The non-transitory computer-readable storage medium of claim 9, wherein the interpage delay value is calculated based on an average processing time for processing the last n pages of the page attribute combination, wherein n is an integer.

* * * * *